United States Patent [19]

Hoopingarner

[11] Patent Number: 5,066,046
[45] Date of Patent: Nov. 19, 1991

[54] METHOD AND APPARATUS FOR ALLOCATING AND RECORDING TIME BLOCKS ON VCR TAPES

[75] Inventor: Brett R. Hoopingarner, Tempe, Ariz.
[73] Assignee: E. W. Hudson, III, Tempe, Ariz.
[21] Appl. No.: 445,417
[22] Filed: Dec. 4, 1989
[51] Int. Cl.$^5$ ............................................. B42D 15/00
[52] U.S. Cl. ........................................ 283/70; 281/38; 283/52.1; 283/81
[58] Field of Search .............................. 283/81, 49-52, 283/117, 74, 42, 38, 39, 36, 67, 70, 48.1, 52.1; 281/29, 30, 15.1, 38; 206/387, 459, 472; 40/122, 625, 626

[56] References Cited

U.S. PATENT DOCUMENTS

| | | | |
|---|---|---|---|
| 3,079,771 | 3/1963 | Donle | 63/19 |
| 3,290,059 | 12/1966 | Newman | 283/81 X |
| 3,883,161 | 5/1975 | McGee et al. | 283/50 |
| 4,221,404 | 9/1980 | Shuffstall | 283/37 |
| 4,255,872 | 3/1981 | Williams | 281/30 |
| 4,330,951 | 5/1982 | Hauer | 40/124.2 |
| 4,331,425 | 5/1982 | Davis, Jr. | 434/252 |
| 4,501,396 | 2/1985 | Tomsyck et al. | 242/199 |
| 4,507,883 | 4/1985 | Tarrant | 283/81 |
| 4,614,360 | 9/1986 | Sheehan et al. | 283/36 |
| 4,630,843 | 12/1986 | Willat | 281/30 |
| 4,669,754 | 6/1987 | LaLonde | 283/36 |
| 4,715,621 | 12/1987 | Colavito et al. | 283/36 |
| 4,813,711 | 3/1989 | Bohlman | 283/81 |
| 4,907,904 | 3/1990 | Baldwin | 283/81 X |
| 4,915,522 | 4/1990 | Greathouse | 281/38 X |

OTHER PUBLICATIONS

"Showfinder, Jr.", Copyright 1987 Product Lab, Alamo, CA.

Primary Examiner—Frank T. Yost
Assistant Examiner—Eugenia A. Jones
Attorney, Agent, or Firm—Cahill, Sutton & Thomas

[57] ABSTRACT

An apparatus for visual logging of programs recorded on videocassettes includes a plurality of log sheets including a plurality of adjacent identical recording time areas representing consecutive recording time intervals on a videocassette. A plurality of markable program description labels each have an area corresponding to a preselected recording time interval, whereby information about a recorded program can be marked on a program description label corresponding in size to the duration of the recorded programs. The program description labels are attached on the recording time areas of the log sheet corresponding to portions of the videocassette on which programs marked on the recording time areas are recorded, respectively by means of "magnetic" transparent adherent plastic film sheets. The log sheets provide a visual representation of the portions of the videocassette on which identified programs are pre-recorded and portions available for recording other programs.

16 Claims, 2 Drawing Sheets

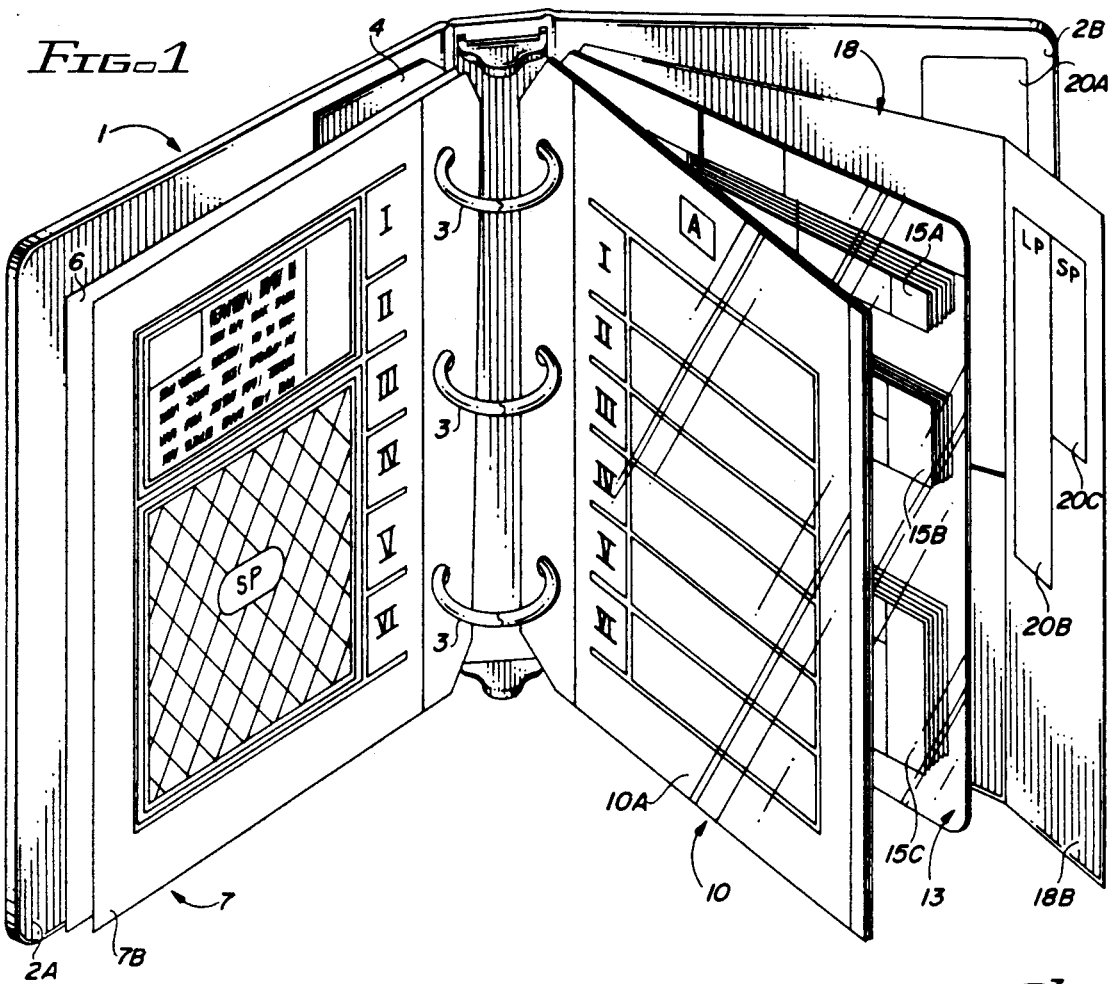
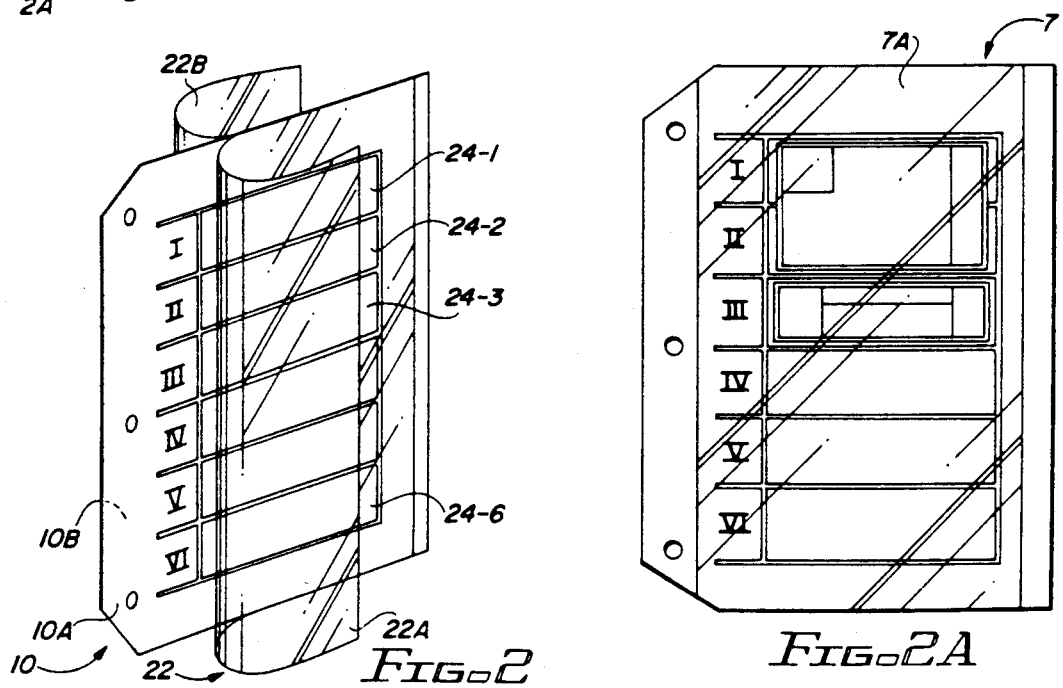

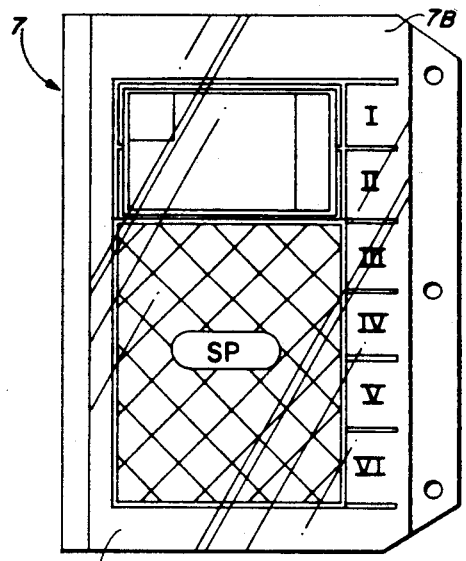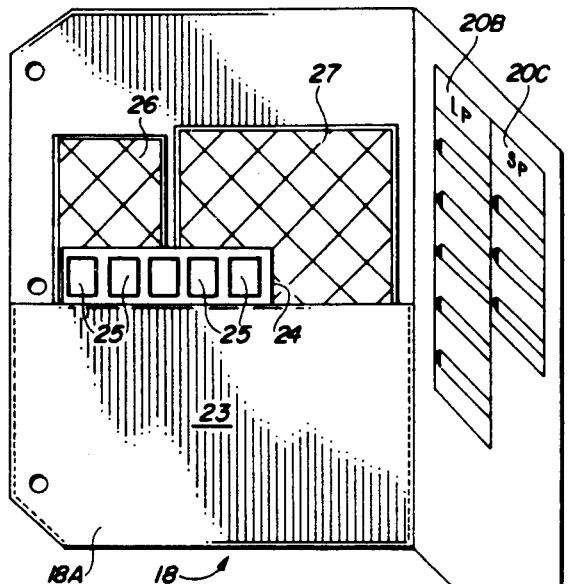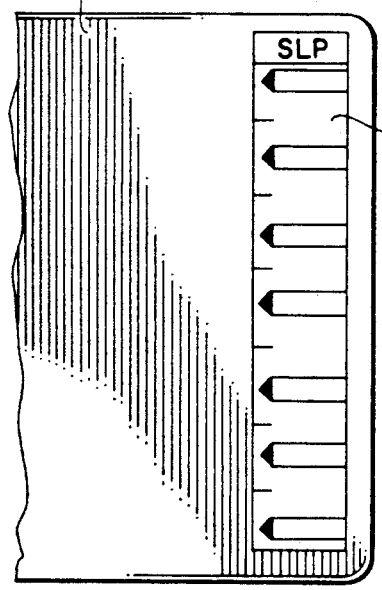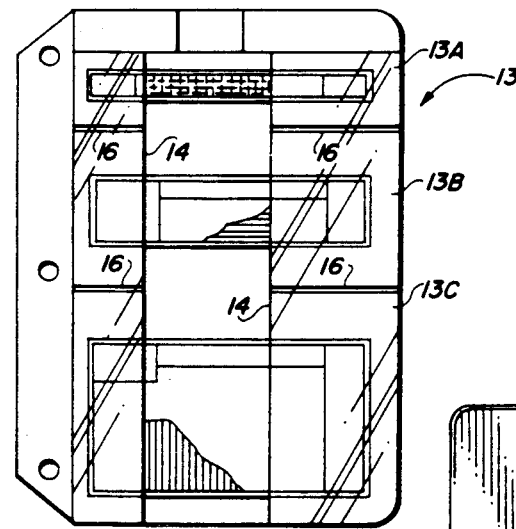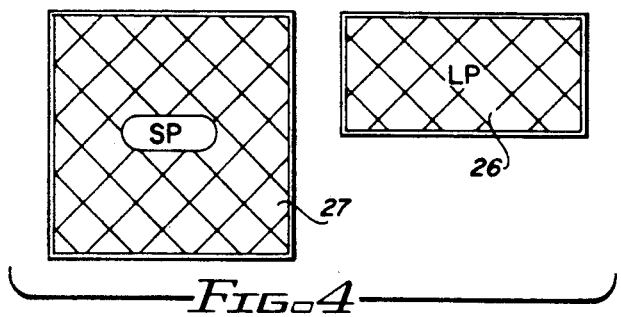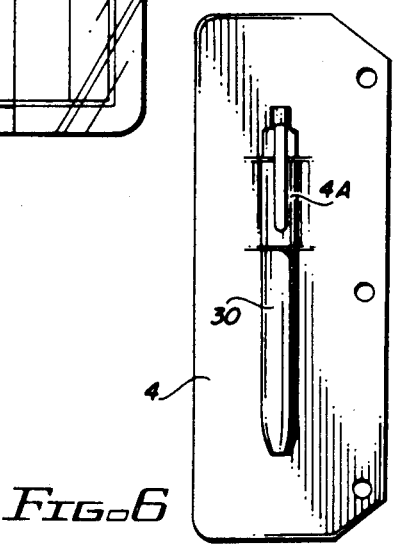

METHOD AND APPARATUS FOR ALLOCATING AND RECORDING TIME BLOCKS ON VCR TAPES

BACKGROUND OF THE INVENTION

People who frequently use VCR's (videocassette recorders) to tape and view prerecorded programs know what a frustrating task it is to keep track of which prerecorded programs are present on a particular videocassette and which portions of the videocassettes are available for recording other programs. It often is very difficult to identify both the length of an unused portion of a videocassette and the location thereof. Therefore it is difficult to find an unused portion (or a used portion which can be recorded over) on which to record a new program of a certain length with confidence that the end of the program being recorded will not "run over" and erase the beginning of another prerecorded program which is intended to be saved. Most people, to the extent that they keep track of programs on videocassettes at all, rely mostly on scribbled notes on labels or separate sheets. A typical VCR owner has had the experience of franticly searching for open videocassette space on which to record a special program. Although there exist some prior "VCR logs", they are oriented to keeping records of programs that are to be recorded and saved indefinitely or for a long period of time. However, these prior VCR logs do not adequately deal with the problem of finding the location of available space for recording new programs. Consequently, VCR users usually find it difficult or impossible to determine whether there exists enough videocassette recording space to record a program of a particular length, and if so, precisely where on the videocassette tape that space (i.e., lengthy video tape) begins.

Pat. No. 4,501,396 discloses a "time-remaining gauge" for use with videocassettes, but it provides no identification of the subject matter that is on the tape, and only indicates how much consecutive tape has been used measured from the beginning of the videocassette. This reference does not solve the problem of precisely identifying a part of a videocassette that is available to be reused or identifying what program has been prerecorded on a particular part of a videocassette. Pat. No. 4,813,711 discloses a "video tape index" that catalogs programs on a videocassette. This index is set up as a form which indicates video cassette numbers for a plurality of cassettes, and indicates six timeslots for videocassettes in which a title and other information pertaining to a program can be entered. The device has an erasable surface. However, this reference does not disclose anything that provides an immediate visual indication of how much useable space of a videocassette is available for recording another program and where that space is located.

Thus, there is augment need for an improved apparatus and method for providing a rapid, visual indication of the amount of available spacer left for recording on a videocassette, where the available space is located, and also indicating the title and other information regarding each program that is presently stored on the videocassette.

SUMMARY OF THE INVENTION

Accordingly, it is an object of the invention to provide a method and apparatus that shows information, such as titles, identifying programs on a "partially used" videocassette, allows entry of other information concerning prerecorded programs, gives a visual, graphic representation of the length and location of already recorded programs on a videocassette and also gives a visual, graphic representation of the length and location of space available on the videocassette for recording new programs.

It is another object of the invention to avoid the frustration and inconvenience that many VCR owners have in finding available space for recording anew program on a partially used video cassette and identifying the subject matter and duration of programs already recorded thereon.

Briefly described, and in accordance with one embodiment thereof, the invention provides an apparatus for visual logging of programs recorded on videocassettes. The apparatus includes a looseleaf binder containing a plurality of log sheets each including a plurality of adjacent identical recording time areas representing consecutive recording time intervals, respectively, on a videocassette. The apparatus also includes a plurality of marketable program description labels each having an area corresponding to a preselected recording time interval, whereby information about a recorded programing be marked on a program description label corresponding in size to the duration of the recorded program, and a means for attaching the program description labels on the recording time areas of the log sheet so as to correspond to portions of the videocassette on which programs identified on the program description labels are recorded, receptively. The log sheet thereby provides a visual representation of both the portions of the video cassette on which identified programs are pre-recorded and portions available for recording other programs. In the described embodiment, the recording time areas are rectangular, and each side of each log sheet includes size of the rectangular recording time areas. Each recording time areas corresponds to one hour of program recording time. The attaching means includes clear plastic film adherent on contact to the surfaces of the log sheets to hold program description labels against selected rectangular recording time area. All of the program description label have the same width as the recording time areas. Some of the program description labels have one-half he height of the recording time areas and represent a one-half hour program recording interval, others of the program description labels have the same height as the recording time areas and represent one hour of program recording time, and others of the program description label have twice the height of the recording time areas and represent a two hour program recording intervals. The apparatus includes a pocket sheet containing a plurality of rectangular LP masks each having the same width and twice the height of the recording time areas for covering the last two recording time areas of a group to indicate that the last two recording time areas are not useable when recording is being performed at the LP speed. The pocket sheet also contains a plurality of rectangular SP masks each having the same width and four times the height of the recording time areas for covering the last four recording time areas of a group to indicate that the last four recording time areas are not useable when recording is being performed at the SP speed. The apparatus also includes a counter scale for indicating VCR counter values at half-hour intervals on a group of adjacent recording time areas.

BRIEF DESCRIPTION OF THE DRAWINGS

FIG. 1 is a perspective view of the video log of the present invention.

FIG. 2 is a partial perspective view of a log sheet in the video log of FIG. 1.

FIGS. 2A and 2B are plan views of front and back pages of the log sheet of FIG. 2 with various "entries" made therein.

FIG. 3 is a partial perspective view of a pocket sheet storing masks, name labels, and counter measurement device for use in the video log of FIG. 1.

FIG. 4 is a plan view showing an LP mask sheet and an SP mask sheet to be used in conjunction with the log sheets of the invention.

FIG. 5 is a plan view of an insert holder for storing program description labels.

FIG. 6 is a plan view of a pen holder and pen that fits into the looseleaf binder of FIG. 1.

FIG. 7 is a plan view of an SLP counter measure which can be utilized in the video log of FIG. 1.

DETAILED DESCRIPTION OF THE PREFERRED EMBODIMENT

Referring now to the drawings, especially FIG. 1, looseleaf three-ring binder 1 includes a front cover 2A and a back cover 2B. A narrow pen support sheet 4 in the front portion of binder 1, also shown in detail in FIG. 6, includes a loop 4A which supports pen 30. The next sheet, designated by reference numeral 6, is an instruction sheet. The following sheet (going from front cover 2A toward rear cover 2B is a "sample" log sheet 7, examples of which are shown in FIGS. 2A and 2B.

Next, the 3-ring binder 1 includes a suitable number of log sheets 10, each of which has a front side 10A and an identical back side 10B, subsequently described with reference to FIG. 2.

Next, a plastic, transparent insert holder sheet 13 includes three pockets for holding half-hour program description labels 5A, one hour program description labels 15B, and two hour program description labels 15C, which are withdrawn and placed over appropriate time slots on the log sheets 10, as subsequently explained.

The last sheet in binder 1 is a sheet 18 having a pocket section 18A and a foldout section 18B, as shown in FIG. 3.

Each of the log sheets 10 includes a stiff cardboard page 10A having thereon a peelback transparent film 22 essentially identical to the transparent peelback films in ordinary so-called "magnetic photo albums". The front and back surfaces 10A and 10B of each log sheet 10 consists of material to which the transparent film sheets 22A and 22B tightly adheres upon contact, to hold the program description labels in selected locations on the log sheets.

The front face 10A of log sheet 10 includes six identical adjacent rectangular frames (i.e., time recording areas) thereon, namely frames 24-1, 24-2 . . . 24-6, also identified by printed Roman numerals I through VI.

As is well known, conventional VHS videocassettes can record six hours of program material on the SLP (Super Long Play) speed, four hours of program material on the LP (Long Play) and two hours on the SP (Slow Play) speed. Many users record programs on the SLP speed, so on each face 10A or 10B of log sheet 10, each of the six rectangular areas 24-1 . . . 24-6 represents one hour of recording space on that videocassette capable of storing recorded material.

In accordance with the present invention, the program description labels 15A (which can be withdrawn from transparent pocket sheet 13 and used on the log sheets 10) have a height equal to one-half the height of the rectangular sections 24-1, 24-2, etc., and are marked on to identify half-hour programs. Each of the program description labels 15A has a left portion useful for entering starting and ending VCR counter values for the program recorded, a central portion suitable for entering the title or name of the program and additional room for briefly describing the program. The right hand portion of each program description insert can be initialized by persons who have replayed that program, to indicate whether that space on the videocassette is now available for recording a new program. The half-hour program description labels 15A are color coded (for example light yellow) for convenience. The program description labels 15B have twice the height of program description labels 15A, and completely cover a rectangular area 24-1, etc. Program description labels 15B are utilized for one hour programs, and are color coded light blue. Finally, program description labels 15C (which are color coded pink) have twice the height of program description labels 15B, and cover two of the rectangular areas 24-1, 24-2, etc., of a log sheet 10, thereby representing a two-hour recorded program.

Thus, when a person using a VCR to record a program at the SLP speed first uses a new rewound videocassette corresponding to the front face 10A of log sheet 10, and records a two hour program on the beginning of the videocassette, he or she will remove one of the two hour program description labels 15C from insert pocket sheet 13, write the beginning VCR counter value in the left block thereof, the title in the center portion, and, either before or after recording that two hour program, may write any desired additional notes, peel back transparent sheet 22A, and place the program description label to cover rectangular areas 24-1 and 24-2. Suppose the user later wishes to record a one hour program in the next available space on the same videocassette, which would be the first half-hour section in the upper half of area 24-3 in FIG. 2. The user gets one of the one hour program description labels 15B, enters the beginning VCR counter value, the program name and any other desired information, and inserts that program description label under the transparent sheet 22A to cover time recording area 24-3. The log sheet then appears as shown in FIG. 2A.

Someone later wishing to record more material on the same videocassette can see that three hours (corresponding to areas IV, V, and VI) are still available on the videocassette for recording at the SLP speed. If someone wishing to record a one hour program recognizes that the second program recorded on the present videocassette already has been viewed by everyone who wishes to see it, that person can remove the marked up one hour program description label 15B and replace it with a blank one, and fill in the new program name, etc. The one-hour program then can be recorded over the previous program by simply fast forwarding the videocassette to the proper VCR counter number, which can be found by reference to the counter measure 20A (assuming that the videocassette was rewound when inserted into the VCR and the VCR counter was reset to zero).

Thus, the simplest use of the video log of the present invention at the SLP speed simply involves considering each of the rectangular areas 24-1. . . 24-6 as corresponding to one hour intervals. When programs have been recorded over portions of the videocassette corresponding to the areas 24-1. . . 24-6, program description labels 15A-C which have been properly marked and placed in the log sheets indicate to the user which programs have been recorded on the videocassette, which recorded programs have been already viewed (and therefore can be erased or recorded over) and which space is available for recording new programs.

The "counter measure" 20A shown in FIG. 7 for use with programs recorded at the SLP speed has an adhesive backing and can be attached to the inside right edge of the back cover 2A, so that the arrows are aligned with the horizontal boundaries of the rectangular areas 24-1. . . 24-6. Half-hour increments on the tape measures are indicated as dashes, and one hour increments are indicated by left pointing arrows. The VCR counter values corresponding to each of these locations can be entered adjacent to the arrows and dashes, if desired. This is a further aid to the user in rapidly advancing or rewinding the videocassette to the beginning or end of a particular program or to the beginning of an available time segment into which a new program can be recorded.

At this point, it will be convenient to refer further to the contents of pocket sheet 18 in FIG. 3. Pocket 23 initially includes the counter measure 20A (referred to previously) which is removed and adhesively attached to the back cover to be as described above. Pocket 23 also includes a sheet 24 of adhesive-backed labels 25 which can be peeled off in pairs, one to be attached to the upper edge of each page of each log sheet 10 to correlate it to a particular videocassette to which the other label is attached. A videocassette identifying number (i.e., A, B, C, or 1, 2, 3, etc.) is marked on each of the pairs of two labels 25 before attaching one to the videocassette and the other to the log sheet corresponding to that videocassette.

Pocket 23 also includes a plurality of LP "masks" 26 and SP masks 27. An inside cover of fold-out sheet 18B includes an SP counter measure 20C and a LP counter measure 20B imprinted thereon. When a videocassette is being played at either of these speeds, section 18B can be folded out, and the counter measure will be aligned automatically with the opposite log sheet and indicate time intervals available for recording and time intervals already used by prerecorded programs.

"Masks" are provide to alter the log sheets for convenient use at the LP and SP tape speeds. The masks thereby allow easy visual representation for alternate tape speeds. The smaller "LP" masks are placed over the last two "hour" blocks 24-5 and 24-6 of the log sheets 10, thus indicating that these two blocks are unavailable at the LP speed. The larger SP mask 27 is inserted under the transparent magnetic plastic sheet 22A covering the last four hour blocks 24-3, 24-4, 24-5, and 24-6 as shown in FIG. 2B for tape recording at the SP speed, indicating that the last four blocks are unavailable at the SP speed. Counter measure 20C is used in this case.

By recording programs on hour and half-hour locations of the log sheet and counter measures being used, half-hour time blocks of available recording space of the videocassette are easily found, and recording of new programs is easily accomplished without overwriting prerecorded material which the user desires to save.

Preferably, the user always rewinds the tape when finished using it so that it is easy to find and replay a program on that tape by using the counter number in the future and it is also easy to move to an available recording space by referring to the counter number and fast forwarding the VCR accordingly. The above described video log thus provides a convenient way of logging programs recorded on videocassettes, making it possible to tell at a glance what programs are located on what portions of the videocassette and what spaces on the videocassette are available for recording new programs.

While the invention has been described with reference to a particular embodiment thereof, those skilled in the art will be able to make various modification of the described embodiment without departing from the true spirit and scope of the invention. For example, slightly different log sheets could be used for LP and SP speeds, and more than one group of time recording areas such as 24-1 etc. could be provided on one page of a log sheet so that the contents and available recording space on two or more videocassettes could be represented thereon. The log sheets could be attached to a videocassette jacket, or could be electronic displays with an associated keyboard, and could even be incorporated into a VCR so as to keep a display record of all programs recorded and available recording space on a library of videocassettes.

What is claimed is:

1. An apparatus for visual logging of programs recorded on videocassettes, the apparatus comprising in combination:
    (a) a log sheet including a plurality of adjacent identical recording time areas, dimensions of which represent consecutive recording time intervals on a videocassette, respectively;
    (b) a plurality of markable program description labels each having an area corresponding to a preselected recording time interval, information about various recorded programs being marked on individual ones of the program description labels, receptively, that correspond in size to the durations of the recorded programs;
    (c) means for attaching the program description labels on the recording time areas of the log sheet corresponding to portions of the videocassette on which programs identified on the program description labels are recorded, respectively,
    where the log sheet provides a visual representation of the portions of the videocassette on which the identified programs are pre-recorded and portions avaialbe for recording other programs.

2. The apparatus of claim 1 including a plurality of the log sheets.

3. The apparatus of claim 2 wherein each log sheet includes a plurality of groups of recording time areas, each group corresponding to a different videocassette.

4. The apparatus of claim 3 wherein the recording time areas are rectangular.

5. The apparatus of claim 4 wherein each of the groups includes six of the recording time areas, each recording time area corresponding to one hour of program recording time on a videocassette.

6. The apparatus of claim 5 wherein the program description labels are rectangular.

7. The apparatus of claim 6 wherein some of the program description labels each have the same width and one-half the height of the recording time areas and represent a one-half hour program recording interval, others of the program description labels each have the same width and height as the recording time areas and represent one hour of program recording time, and others of the program description labels each have the same width and twice the height of the recording time areas and represent a two hour program recording interval 8. The apparatus of claim 7 including a plurality of rectangular long play masks for use at a standard long play speed of a videocassette player each having the same width and twice the height of the recording time ares for covering the last two recording time areas of a group to indicate that said last two recording time areas are not useable when recording is being performed at the long play speed, and also including a plurality of rectangular slow play masks for use at a standard slow play speed of a videocassette player each having the same width and four times the height of the recording time areas for covering the last four recording time ares of a group to indicate that said last four recording time areas are not useable when recording ti being performed at the slow play speed.

9. The apparatus of claim 8 including a counter scale for indicating VCR counter values at half-hour intervals on a group of adjacent recording time areas.

10. The apparatus of claim 1 wherein the attaching means includes clear plastic film adherent on contact to a surface of the log sheet to hold the program description labels thereon.

11. A method for visual logging of programs recorded on videocassettes using a log sheet including a plurality of adjacent identical recording time areas, dimensions of which represent consecutive recording time intervals on a videocassette, and a plurality of different-sized markable program description labels each having an area corresponding to a preselected recording time interval, comprising the steps of:

(a) entering information about a recorded program on one of the labels corresponding in size to a duration of the recorded program;

(b) attaching the program description label on one of the recording time areas of the log sheet corresponding to a portion of a videocassette on which the program entered on the recording time area is recorded;

(c) repeating steps (a) and (b) for a different program and a different program description label, whereby the log sheet provides a visual representation of portions of the videocassette on which identified programs are pre-recorded and portions of the videocassette available for recording other programs.

12. The method of claim 11 wherein the log sheet includes a plurality of groups of recording time areas, each group corresponding to a different videocassette, wherein the recording time areas are rectangular, each of the groups includes six of the recording time areas, each recording time area corresponding to one hour of program recording time on a videocassette, the method including attaching the program description labels to the log sheet by means of a sheet of clear plastic film adherent on contact to the surface of the log sheets.

13. The method of claim 12 wherein the program description labels are rectangular, some of the program description labels each have the same width and one-half the height of the recording time areas and represent a one-half hour program recording interval, others of the program description labels each have the same width and height as the recording time areas and represent one hour of program recording time, and others of the program description labels each have the same width and twice the height of the recording time areas and represent a two hour program recording interval, the method including selecting one of the program description labels the height of which corresponds to the length of the program to be recorded next.

14. The method of claim 13 including using a rectangular long play mask for sue at a standard long play speed of a videocassette player having the same width and twice the height of the recording time areas to cover the last two recording time areas of a group to indicate that said last two recording time areas are not useable when recording is being performed at the long play speed.

15. The method of claim 13 including using a plurality of rectangular slow play masks for use at a standard slow play speed of a videocassette player each having the same width and four times the height of the recording time areas to cover the last four recording time areas of a group to indicate that said last four recording time areas are not useable when recording is being performed at the slow play speed.

16. An apparatus for visual logging of progress recorded on videocassettes, the apparatus comprising in combination:

(a) a log sheet including first and second parallel line, the distance between the first and second lines representing the total amount of tape of a videocassette;

(b) a plurality of markable program description labels each having an area corresponding to a preselected recording time interval, information about recorded programs being marked on individual ones of the program description labels that correspond in size to the durations of the recorded programs, receptively;

(c) means for attaching the program description labels on portion of the log sheet between the first and second lines corresponding to portions of the videocassette on which programs identified on the program description labels are recorded, respectively, whereby the log sheet provides a visual representation of the portions of the videocassette on which the identified programs are pre-recorded and portions avaialbe for recording other programs.

* * * * *